(12) United States Patent
Egloff

(10) Patent No.: US 7,219,627 B1
(45) Date of Patent: May 22, 2007

(54) ELECTRICAL BANDAGE PROTECTOR

(75) Inventor: E. Ralph Egloff, Skokie, IL (US)

(73) Assignee: Electronic Materials LLC, Lakeville, MN (US)

( * ) Notice: Subject to any disclaimer, the term of this patent is extended or adjusted under 35 U.S.C. 154(b) by 32 days.

(21) Appl. No.: 10/945,662

(22) Filed: Sep. 21, 2004

Related U.S. Application Data

(60) Provisional application No. 60/504,909, filed on Sep. 22, 2003.

(51) Int. Cl.
*A01K 15/02* (2006.01)

(52) U.S. Cl. .................................... 119/859

(58) Field of Classification Search ............... 119/712, 119/850, 859; 340/573.3, 604; 429/97, 429/162, 127
See application file for complete search history.

(56) References Cited

U.S. PATENT DOCUMENTS

| | | | |
|---|---|---|---|
| 718,896 A * | 1/1903 | Ames et al. ............... 607/112 |
| 4,153,009 A * | 5/1979 | Boyle ...................... 119/850 |
| 4,205,671 A * | 6/1980 | Lassen ..................... 128/886 |
| 4,560,445 A * | 12/1985 | Hoover et al. ............. 205/126 |
| 4,969,418 A * | 11/1990 | Jones ....................... 119/712 |
| 5,158,039 A * | 10/1992 | Clark ....................... 119/712 |
| 5,896,830 A | 4/1999 | Stampe ..................... 119/822 |
| D417,529 S | 12/1999 | Stampe ..................... D30/144 |
| 6,000,366 A | 12/1999 | Reeping .................... 119/850 |
| 6,127,024 A * | 10/2000 | Weiss et al. ............... 428/204 |
| 6,346,346 B1 * | 2/2002 | Naskali ..................... 429/127 |
| 6,453,850 B1 | 9/2002 | Stampe ..................... 119/712 |
| 6,561,136 B2 | 5/2003 | Kuntz ....................... 119/712 |
| 6,980,852 B2 * | 12/2005 | Jersey-Willuhn et al. ... 600/547 |
| 2002/0026226 A1 | 2/2002 | Ein ......................... 607/108 |
| 2004/0000274 A1* | 1/2004 | James ....................... 119/859 |

* cited by examiner

*Primary Examiner*—Teri Pham Luu
*Assistant Examiner*—Kimberly S. Smith

(57) ABSTRACT

A flexible electric bandage protector for use on a bandage or an animal. The protector comprising a flexible thin battery and a conductive layer disposed on one side of the battery. The conductive layer is in the form of two sets of conductive traces, the conductive traces not being conductively connected to each until touched by the mouth of the animal and wherein the battery has sufficient voltage to cause discomfort to the animal.

6 Claims, 2 Drawing Sheets

ELECTRICAL BANDAGE PROTECTOR

The present application is based on and claims the benefit of U.S. provisional patent application Ser. No. 60/504,909, filed Sep. 22, 2003, the content of which is hereby incorporated by reference in its entirety.

BACKGROUND OF THE INVENTION

The present invention relates generally to devices that discourage animals from instinctively licking their wounds.

In the past, various devices have been proposed and/or employed for use in discouraging animals from licking their wounds. These devices, for the most part, have been cumbersome.

Examples of prior art devices are described in U.S. Pat. Nos. 5,896,830, 6,000,366, 6,453,850, 6,561,136 and Des. 417,529.

SUMMARY OF THE INVENTION

The present invention includes a flexible electric bandage protector for use on a bandage or an animal. The protector comprising a flexible thin battery and a conductive layer disposed on one side of the battery. The conductive layer is in the form of two sets of conductive traces, the conductive traces not being conductively connected to each until touched by the mouth of the animal and wherein the battery has sufficient voltage to cause discomfort to the animal.

DETAILED DESCRIPTION OF THE PREFERRED EMBODIMENTS

Figure 1:
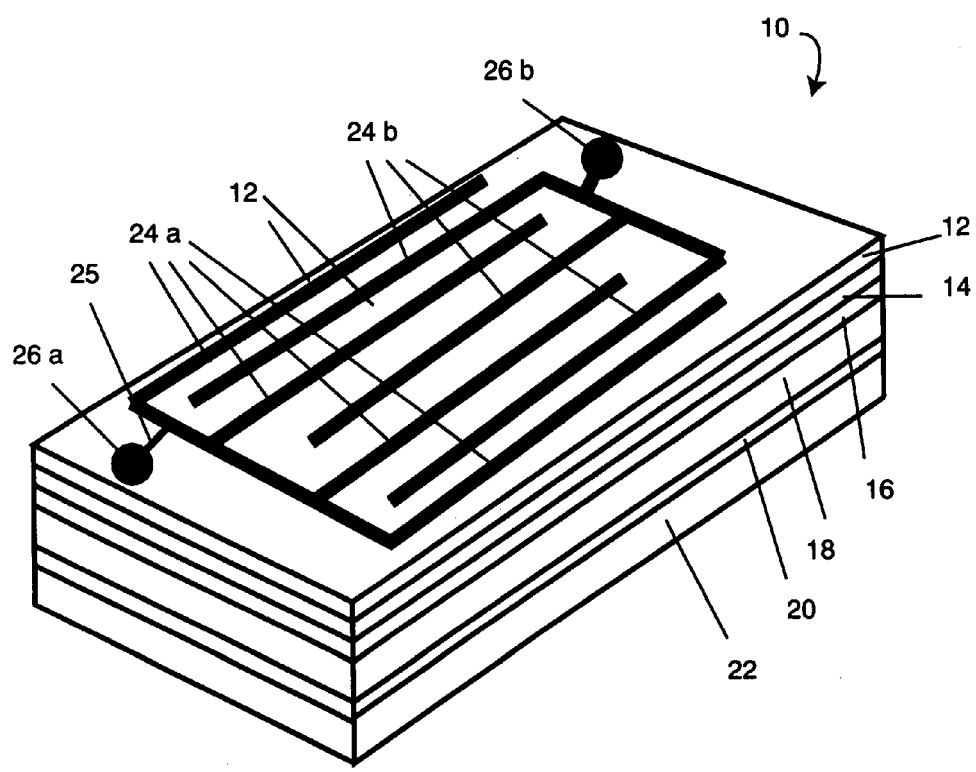
FIG. 1 is a perspective view of the present invention.
Figure 2:
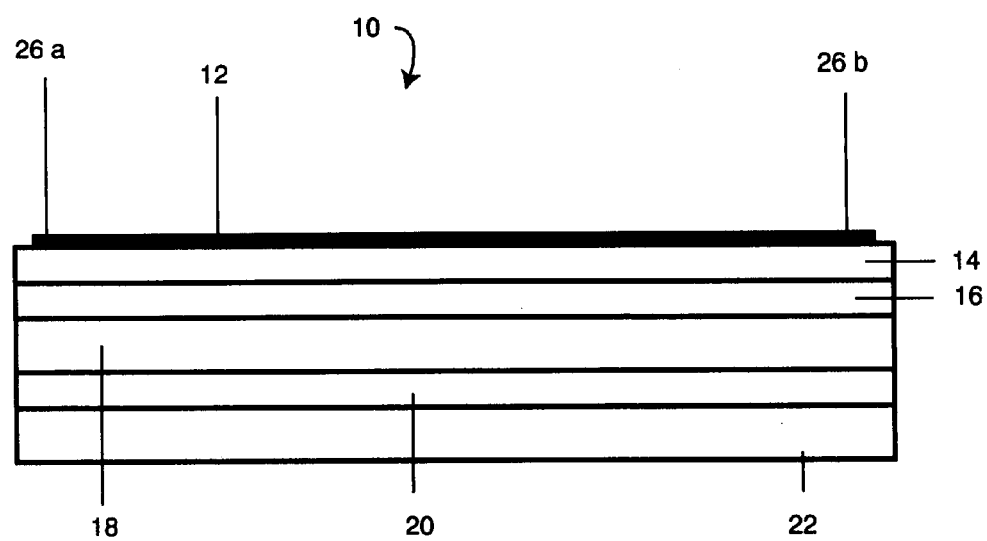
FIG. 2 is a side view of the present invention.

The device of the present invention is generally indicated at 10 in FIG. 1. The device 10 is in the form of a flexible electric bandage protector that utilizes an electrical charge to discourage the licking or biting off of a medical bandage. The electrical bandage protector of the present invention includes a layer of electrical traces 12, a substrate layer 14, a pressure sensitive adhesive layer 16, a battery layer 18, a pressure sensitive adhesive layer 20, and a release liner 22, as best illustrated in FIG. 2.

The trace layer 12 includes a plurality of electrically conductive traces 24a and 24b running substantially parallel to each other, as illustrated in FIG. 1. Preferably, the traces 24a and 24b are spaced from each other and run longitudinally with respect to the longitudinal configuration of the particular electrical bandage protector illustrated in FIG. 1. However, the traces 24a and 24b may run in a transverse direction or in any other direction or in any other pattern. The conductive traces 24a are not conductively connected to conductive traces 24b and are an "open" circuit. Conductive traces 24a and 24b provide an electrical current having sufficient voltage to tingle an animal's lips or tongue when the animal's lips or tongue touch the traces 24a and 24b. The animal's lips or tongue (including saliva) provide a conductor between traces 24a and 24b, thereby carrying current and discomfort to the animal.

Preferably, the conductive traces 24a and 24b are printed in silver ink over coated with carbon ink (to prevent silver migration) on the substrate 14 using either well-known screen printing methods, gravure printing methods, or flexo printing methods. Preferably, the substrate 14 is made from a flexible dielectric, such as polypropylene, polyethylene, terephthalate and other similar polymers that can be made into flexible plastic films. The pressure sensitive adhesive layer 16 secures the substrate to the battery 18.

Conductive silver and protective carbon ink suitable for screen-printing process include Electrodag® PF-427 and Electrodag® 725A. Electrodag 423SS Acheson Colloids Company of Port Huron, Mich. Suitable conductive inks for flexo printing or gavure printing processes include Electrodag® 415, Electrodag® PD-034, Electrodag® PD-022, Electrodag® PM-011 and Electrodag® PE-001 Electrodag 154. The conductive and protective inks are cured according to specifications provided by Acheson Colliods Company to form the conductive traces. The conductive traces after curing should be at least about 0.3 mils in thickness and should be between about 5 mils to 10 mils in width to provide maximum conductivity throughout the extent of the traces. Similar inks are available from DuPont, Dow, and other companies.

The traces 24a and 24b also include a fuse section 25. The fuse section 25 is formed by printing a short thin section of a trace using the same conductive ink as forming the traces. The fuse section 25 should be thin enough such that if the animal accidentally deforms any of the traces, forming a short, the increase in current flowing through the fuse 25 will burn or melt the fuse 25 thereby stopping current from flowing through the traces 24a and 24b. The fuse 25 prevents traces 24a and 24b in a short situation from getting hot, and either burning the animal or its bedding.

The traces 24a and 24b are connected by through-hole connections 26a and 26b that connect the traces 24a and 24b to the battery 18. Preferably, the fuse 25 is formed near one of the through-hole printed connections 26a and 26b. Holes may be punched into the substrate layer 14 proximate the terminals (not shown) of the battery so that when the traces 26a and 26b are formed with the conductive ink, the conductive ink flows into the through-holes to make a conductive connection with the terminals (not illustrated) of the battery 18. Conductive adhesive Acheson 5810 can be used to connect battery if separate layer is used on the battery.

The battery 18 of the present invention is a thin flexible battery made of conventional zinc maganese-dioxide components in the 0.0156" to 0.0312" range. Production of thin flexible batteries using zinc maganese-dioxide is well known. Suitable flexible thin batteries are made by Thin Battery Technologies Inc. of Cleveland, Ohio. Such batteries are non-toxic to animals, and therefore, if the animal ingests the battery or a portion of the battery, it will not be harmed. The battery 18 is preferably from 9 to 12 volts, or more, which is sufficient voltage to provide the animal with an undesirable experience when the traces 24a and 24b are licked. The traces 24a run across the top of the device 10 without touching the traces 24b. Consequently, the top of the device 10 is an open circuit until the animal licks the traces and provides a conductive path for current to flow between traces 24a and 24b.

The battery 18 can be conductively connected to the traces 24a and 24b permanently since the traces are in an open circuit configuration and do not draw current from the battery until the animal licks the battery. Therefore, the battery will not run down over time. The only time that current is drawn from the battery is when an animal licks the traces and provides a conductive path between traces 24a and 24b.

Alternatively, the traces 24a and 24b and fuse 25 could be printed directly on the battery 18. The ends of the traces 24a and 24b would then directly be connected to the terminals of the battery.

Pressure sensitive adhesive layer 20 is applied to a side of the battery opposite from the traces 24a and 24b. The pressure sensitive adhesive layer 20 permits the veterinarian or other person to apply the device 10 over the medical bandage. Preferably a release liner 22 with a release layer is positioned over the pressure sensitive adhesive layer 20 so that the adhesive layer 20 may be exposed by simply peeling off the release liner 22 and securing the device 10 to the medical bandage. A hook and loop device with pressure sensitive adhesive can be used on the back of the release liner to attach the bandage protector in a reusable mode so dressings can be changed. Suitable pressure sensitive adhesives and hook and loop fasteners are made by Minnesota Mining and Manufacturing Company of St. Paul, Minn.

Although the present invention has been described with reference to preferred embodiments, workers skilled in the art will recognize that changes may be made in form and detail without departing from the spirit and scope of the invention.

What is claimed is:

1. A flexible electric bandage protector device for securing to a bandage on an animal, the device comprising:
   a flexible thin battery; and
   a printed flexible conductive layer disposed on one side of the battery, the conductive layer comprising two sets of printed flexible conductive traces, the printed flexible conductive traces not being conductively connected to each other until touched by mouth of the animal and wherein the battery has sufficient voltage to cause discomfort to the animal;
   whereby, the flexible thin battery and printed flexible conductive layer may be wrapped around a body part of the animal.

2. The device of claim 1 wherein the printed flexible conductive traces, comprising of a printed silver base having edges and printed carbon layer applied extending over the edges of the printed silver base, are disposed on a substrate and the substrate is adhered to the battery.

3. The device of claim 1 and further including an adhesive layer secured to the battery on a side opposite from the traces such that the battery can be adhered to a bandage.

4. The device of claim 3 and further including a release liner over the adhesive layer, such that a hook and loop fastener can be attached to the release liner and used to attach and reuse the device when dressings are changed.

5. The device of claim 1 and further including a fuse conductively positioned between one of the traces and in conductive connection to the battery.

6. The device of claim 1 wherein the battery has a voltage from 9 to 12 volts or more.

* * * * *